J. J. Smokey's Harness.
74623
PATENTED
FEB 18 1868
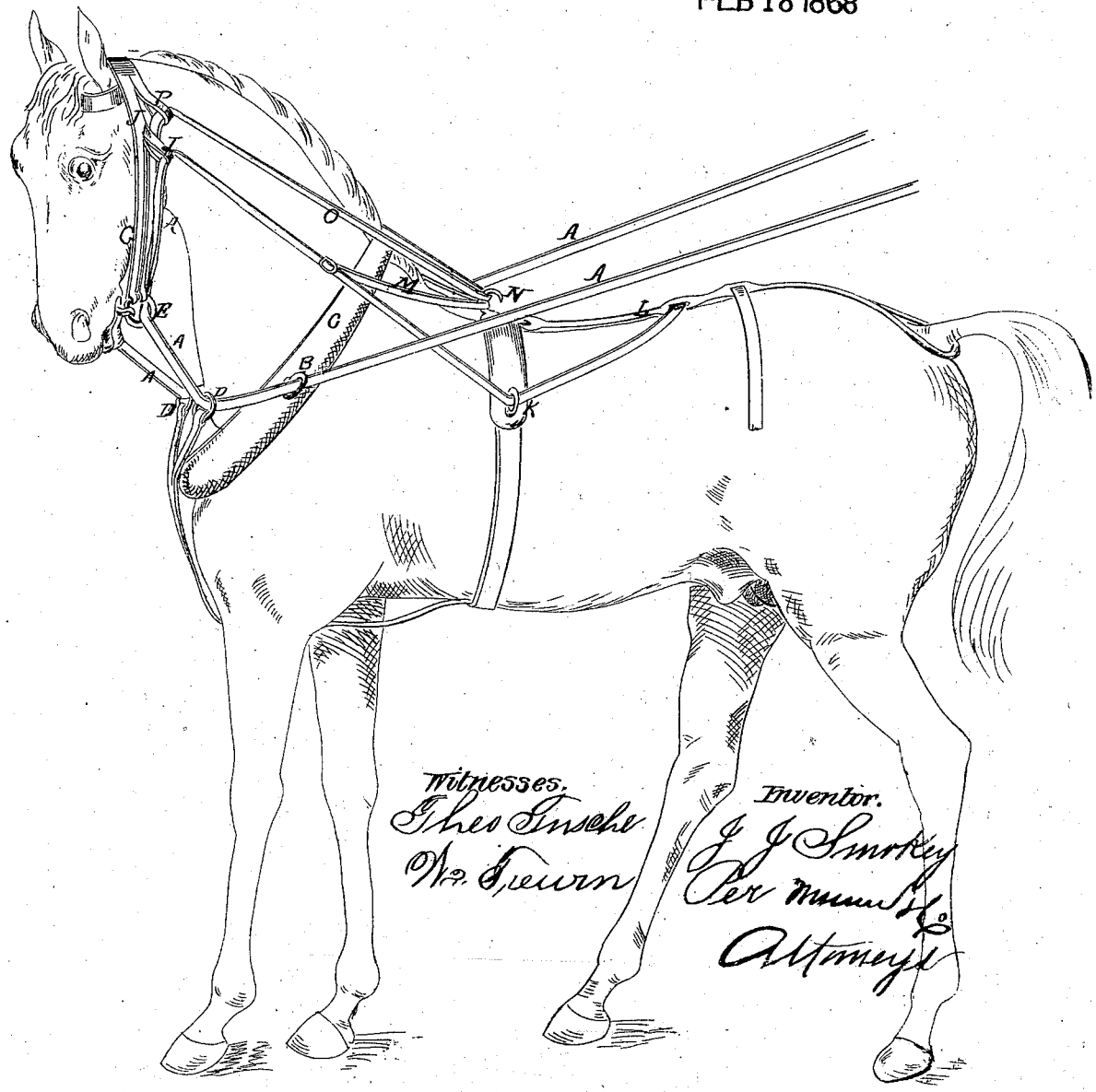
Witnesses.
Theo Tusche
Wr Tewrn
Inventor.
J. J. Smokey
Per [illegible]
Attorneys

United States Patent Office.

JOHN J. SMOKEY, OF NATCHEZ, MISSISSIPPI.

Letters Patent No. 74,623, dated February 18, 1868.

IMPROVEMENT IN HARNESS.

The Schedule referred to in these Letters Patent and making part of the same.

TO ALL WHOM IT MAY CONCERN:

Be it known that I, JOHN J. SMOKEY, of Natchez, in the county of Adams, and State of Mississippi, have invented a new and useful Improvement in Harnesses; and I do hereby declare that the following is a full, clear, and exact description thereof, which will enable those skilled in the art to make and use the same, reference being had to the accompanying drawings, forming part of this specification.

The present invention relates to the driving-reins of harnesses, and consists in so arranging the driving-rein as to give great leverage to the driver over the animal, and thus enable him to easily control the animal, and without irritating him, but leaving him free to use his utmost speed, and, in fact, to encourage him so to do, while at the same time the animal can be readily checked by the driver.

In the accompanying plate of drawings my improvement in harnesses is illustrated, the figure being a side view of a horse, provided with a harness having my improved arrangement of driving-reins.

A, in the drawings, represents the driving-reins, which are passed through the guide-rings B, upon each side of the collar C, and thence through the martingale-rings D, to and through the rings E of the bit F, and up and along the cheek-straps G of the head-gear, to and through loops I of gag-runner or strap J, to and through the terret-rings K to the crupper-strap L, wherein they are secured. M, straps buckled to reins A just in advance of the saddle-hook N, around which they are extended and joined or made as one. O, the ordinary check-rein passing from check or saddle-hook N to and through the loops P to gag-runner or strap J, and thence to the rings of bit E, wherein they are hung. By pulling gently upon the driving-reins A, the chin of the horse is pulled toward the breast, slightly depressing the head, when the driving-reins will be shortened from gag-runner to crupper-strap, relieving the driver from the greater portion of the strain consequent upon the old arrangement of driving-reins, and placing the strain on the short bearing-rein, saddle-hook, and body-crupper, thus securing the advantage of a double leverage, giving additional purchase, through the driving-rein, to the driver over the horse, and security against unmanageable horses when harnessed by the old form of harnesses.

I claim as new, and desire to secure by Letters Patent—

The driving-reins A, when arranged and combined with a harness, substantially as and for the purpose described.

JOHN J. SMOKEY.

Witnesses:
  D. G. SMYTHE,
  JOSIAH GROVER.